United States Patent
Helgesen et al.

(10) Patent No.: US 11,102,925 B2
(45) Date of Patent: *Aug. 31, 2021

(54) ALL WHEEL DRIVE, WALK BEHIND MOWER

(71) Applicant: HUSQVARNA AB, Huskvarna (SE)

(72) Inventors: John Helgesen, Rock Hill, SC (US);
Eric Lennings, Huskvarna (SE);
Robert Fancher, Charlotte, NC (US);
Matthew Lambert, Harrisburg, NC (US)

(73) Assignee: HUSQVARNA AB, Huskvarna (SE)

( * ) Notice: Subject to any disclaimer, the term of this patent is extended or adjusted under 35 U.S.C. 154(b) by 350 days.

This patent is subject to a terminal disclaimer.

(21) Appl. No.: 16/108,275

(22) Filed: Aug. 22, 2018

(65) Prior Publication Data

US 2018/0352737 A1 Dec. 13, 2018

Related U.S. Application Data

(63) Continuation of application No. 15/468,355, filed on Mar. 24, 2017, now Pat. No. 10,080,327, which is a
(Continued)

(51) Int. Cl.
*A01D 69/08* (2006.01)
*A01D 34/68* (2006.01)
(Continued)

(52) U.S. Cl.
CPC ......... *A01D 34/6812* (2013.01); *A01D 34/69* (2013.01); *A01D 34/81* (2013.01);
(Continued)

(58) Field of Classification Search
CPC .. A01D 34/69; A01D 34/006; A01D 34/6812; A01D 34/81; F16H 9/04;
(Continued)

(56) References Cited

U.S. PATENT DOCUMENTS

| | | | |
|---|---|---|---|
| 3,022,621 A | 2/1962 | Zavarella | |
| 3,367,459 A * | 2/1968 | Rubin | F16D 67/02 |
| | | | 192/224.1 |

(Continued)

FOREIGN PATENT DOCUMENTS

| | | |
|---|---|---|
| CN | 1742535 A | 3/2006 |
| CN | 107006229 A | 8/2017 |

(Continued)

OTHER PUBLICATIONS

Allmowerspares "Genuine Country Clipper Blade 13 3/4 Inch High Lift H2423," Retrieved on Dec. 17, 2019 from Website:-https://www.allmowerspares.com.au/genuine-country-clipper-blade-13-3-4-inch-high-lift-h2423.html.

(Continued)

*Primary Examiner* — Thomas B Will
*Assistant Examiner* — Mai T Nguyen
(74) *Attorney, Agent, or Firm* — Burr & Forman, LLP

(57) ABSTRACT

A drive system includes a first transmission, a second transmission and at least one flexible driving member. The first transmission is operably coupled to a first set of wheels to provide drive power to the first set of wheels responsive to engagement of the first transmission. The second transmission is operably coupled to a second set of wheels to provide drive power to the second set of wheels responsive to engagement of the second transmission. The at least one flexible driving member is operably coupled to a remote actuator and a drive shaft of the walk-behind outdoor power equipment device. The at least one flexible member selectively engages one of the first transmission or the second transmission to switch a walk-behind outdoor power equipment device between all wheel drive operation and another drive mode via the remote actuator.

20 Claims, 11 Drawing Sheets

Related U.S. Application Data continuation of application No. 14/377,736, filed as application No. PCT/US2012/024853 on Feb. 13, 2012, now Pat. No. 9,622,407.

(51) Int. Cl.
*A01D 34/69* (2006.01)
*F16H 7/02* (2006.01)
*A01D 34/81* (2006.01)
*F16H 7/08* (2006.01)
*A01D 101/00* (2006.01)

(52) U.S. Cl.
CPC ............. *F16H 7/02* (2013.01); *F16H 7/0827* (2013.01); *A01D 2101/00* (2013.01)

(58) Field of Classification Search
CPC ........ F16H 19/08; F16H 36/06; F16H 63/062; F16H 63/304; F16H 7/02; F16H 7/0827
USPC ........... 56/11.4, 11.8, 16.9; 74/417; 180/19.1
See application file for complete search history.

(56) References Cited

U.S. PATENT DOCUMENTS

| | | | |
|---|---|---|---|
| 3,388,759 A | 6/1968 | Plamper et al. | |
| 3,433,002 A | 3/1969 | Custance | |
| 3,527,034 A | 9/1970 | Hjelmquist | |
| 3,818,686 A | 6/1974 | Haffner et al. | |
| 4,020,619 A * | 5/1977 | Massaro ................ | A01D 34/69 56/11.2 |
| 4,038,883 A | 8/1977 | Jones | |
| 4,738,084 A | 4/1988 | Ogano et al. | |
| 4,771,852 A | 9/1988 | Nishikawa et al. | |
| 4,870,811 A | 10/1989 | Steele | |
| 4,896,487 A | 1/1990 | Hikishima et al. | |
| 4,907,401 A | 3/1990 | Nemoto et al. | |
| 5,377,774 A | 1/1995 | Lohr | |
| 5,718,105 A | 2/1998 | Irikura et al. | |
| 5,797,251 A | 8/1998 | Busboom | |
| 5,803,847 A | 9/1998 | Kamm | |
| 5,809,758 A | 9/1998 | Flanigan et al. | |
| 5,850,758 A * | 12/1998 | McCloud ................ | F16H 3/083 74/371 |
| 5,899,053 A | 5/1999 | Roth | |
| 6,032,443 A | 3/2000 | Aldrich | |
| 6,082,083 A | 7/2000 | Stalpes et al. | |
| 6,425,452 B1 | 7/2002 | Steiner et al. | |
| 6,484,484 B1 | 11/2002 | Thomas | |
| 6,487,840 B1 | 12/2002 | Turner et al. | |
| 6,592,478 B2 | 7/2003 | Wians | |
| 6,604,346 B1 | 8/2003 | Martignon | |
| 6,702,059 B2 | 3/2004 | Blanchard | |
| 6,892,517 B2 | 5/2005 | Adams et al. | |
| 6,948,299 B2 | 9/2005 | Osborne | |
| 6,966,168 B1 | 11/2005 | Kerr, Sr. | |
| 7,219,488 B2 | 5/2007 | Hatfield | |
| 7,337,598 B2 | 3/2008 | Plouraboue et al. | |
| 7,398,637 B1 | 7/2008 | Sevey | |
| 8,226,508 B2 | 7/2012 | Osborne | |
| 8,312,946 B2 | 11/2012 | Lahey et al. | |
| 8,322,121 B1 | 12/2012 | Marcell | |
| 9,616,837 B1 | 4/2017 | Bartel et al. | |
| 9,622,407 B2 | 4/2017 | Helgesen et al. | |
| 9,677,648 B2 | 6/2017 | Wadzinski et al. | |
| 10,493,939 B2 | 12/2019 | Bartel et al. | |
| 2002/0178708 A1 | 12/2002 | Williams et al. | |
| 2003/0182919 A1 | 10/2003 | Baumann et al. | |
| 2004/0168424 A1 | 9/2004 | Baumann et al. | |
| 2006/0102410 A1 | 5/2006 | Dvorak | |
| 2006/0213342 A1 | 9/2006 | Turner et al. | |
| 2010/0000192 A1 | 1/2010 | Robison | |
| 2015/0113932 A1 | 4/2015 | Helgesen et al. | |
| 2016/0201771 A1 | 7/2016 | Wadzinski et al. | |
| 2017/0050600 A1 | 2/2017 | Bartel et al. | |
| 2017/0066396 A1 | 3/2017 | Schlup, Jr. | |
| 2019/0291779 A1 | 9/2019 | Zeiler et al. | |

FOREIGN PATENT DOCUMENTS

| | | |
|---|---|---|
| CN | 106184100 B | 7/2018 |
| EP | 1 055 358 A2 | 11/2000 |
| EP | 1 413 498 A2 | 4/2004 |
| EP | 1415525 A1 | 5/2004 |
| EP | 2 170 032 B1 | 4/2012 |
| EP | 2385755 B1 | 3/2013 |
| WO | 1996/028011 A1 | 9/1996 |
| WO | 2009/000344 A1 | 12/2008 |
| WO | 2010/083019 A1 | 7/2010 |
| WO | 2015/063309 A1 | 5/2015 |
| WO | 2019/129045 A1 | 7/2019 |

OTHER PUBLICATIONS

Amazon "Oregon 92-101 Mower Blade, 21-1/4," Retrieved on Dec. 17, 2019 from Website:- https://www.amazon.com/Oregon-Mower-21-Inch-Bottom-92-101/dp/B002UD6DRY/ref=sr_1_162?s=home-garden&ie=UTF8&qid=1289895575&sr=1-162.

International Search Report and Written Opinion for International Application No. PCT/US2012/024853 dated May 23, 2012, all enclosed pages cited.

International Preliminary Report on Patentability for International Application No. PCT/US2012/024853 dated Aug. 19, 2014, all enclosed pages cited.

"Appendix of Exhibits in Support of Plaintiffs' Opening Claim Construction Brief—vol. 1—Exhibits 5-8," Case No. C.A. No. 15-856-SLR dated Aug. 5, 2016, all enclosed pages cited.

"Appendix of Exhibits in Support of Plaintiff's Reply Claim Construction Brief" Case No. C.A.No. 15 856-SLR-SRF, dated Sep. 16, 2016, all enclosed pages cited.

"Appliance Manufacturer" New and Notable—Toro Personal Pace mower, issued Feb. 2000, all enclosed pages cited.

"Declaration of Dr. Frank J. Fronczak in Support of Husqvarna AB and Husqvarna Professional Products, Inc.'s Reply claim Construction Brief" Case No. C.A. No. 15-856-SLR, dated Sep. 16, 2016, all enclosed pages cited.

"Defendant's Preliminary Claim Constructions" Case No. 15-CV-856-SLR, dated Jun. 17, 2016, all enclosed pages cited.

"Joint Appendix of Patent-In-Suit and Patent File Histories in Support of Parties' Claim Construction Briefs—vol. 1—Exhibits 1-4," Case No. C.A. No. 15-856-SLR dated Aug. 5, 2016, all enclosed pages cited. (electronically submitted in 11 parts).

"Joint Claim Construction Statement," Case No. C.A. No. 15-856-SLR-SRF dated Jul. 15, 2016, all enclosed pages cited.

"Memorandum Order" Case No. Civ. No. 15-856-SLR, dated Sep. 20, 2016, all enclosed pages cited.

"Plaintiff's First Supplemental Response to the Toro Company's Interrogatory No. 13 to HAB" Case No. C.A. No. 15-856-SLR dated Aug. 31, 2016, all enclosed pages cited.

"Plaintiff's First Supplemental Responses to the Toro Company's Interrogatory Nos. 8, 10, and 12 to HAB" Case No. C.A. No. 15-856-SLR dated Aug. 31, 2016, all enclosed pages cited.

"Plaintiff's Opening Claim Construction Brief," Case No. C.A. No. 15-856-SLR-SRF dated Aug. 5, 2016, all enclosed pages cited.

"Plaintiff's Response to the Toro Company's Second Set of Interrogatories (No. 12)," Case No. C.A.No. 15-856-SLR dated Jul. 8, 2016, all enclosed pages cited.

"Plaintiff's Response to the Toro Company's Second Set of Interrogatories (No. 13)," Case No. C.A.No. 15-856-SLR dated Jul. 8, 2016, all enclosed pages cited.

"The Toro Company's First Supplemental Invalidity Contentions," Case No. 15-cv-856-SLR-SRF dated Jun. 22, 2016, all enclosed pages cited. (electronically submitted in 2 parts).

AS Motor Operating Instructions, "Four Wheel Driven Motor AS 53 85-Kat" dated Feb. 24, 2011, all enclosed pages cited.

Declaration of David Moe, Case No. 15-cv-856-SLR dated Apr. 1, 2016, all enclosed pages cited.

(56) References Cited

OTHER PUBLICATIONS

Declaration of Dr. John J. Moskwa regarding Claim Construction of U.S. Pat. No. 9,055,713 B2, filed Sep. 2, 2016, all enclosed pages cited.
Declaration of John Hurst, Case No. 15-cv-856-SLR dated Mar. 22, 2016, all enclosed pages cited.
Declaration of Mike Happe, Case No. 15-cv-856-SLR dated Mar. 17, 2016, all enclosed pages cited.
Declaration of Milton Rache, Case No. 15-cv-856-SLR dated Mar. 1, 2016, all enclosed pages cited.
Declaration of Thiphakone Sivilay, Case No. 15-cv-856-SLR dated Mar. 15, 2016, all enclosed pages cited.
Husqvarna AB and Husqvarna Professional Products, Inc.'s Reply Claim Construction Brief Case No. C.A. No. 15-856-SLR-SRF, dated Sep. 16, 2016, all enclosed pages cited.
Operating Instructions of the Four Wheel Driven Mower by AS Motor issued on Aug. 1, 2014, all enclosed pages cited.
Plaintiffs' Answering Brief in Opposition to the Toro Company's Motion to Stay, Case No. 15-cv-856-SLR dated Apr. 11, 2016, all enclosed pages cited.
Plaintiffs' Answering Brief in Opposition to the Toro Company's Motion to Transfer, Case No. 15-cv-856-SLR dated Apr. 11, 2016, all enclosed pages cited.
Plaintiff's First Supplemental Responses to the Toro Company's Interrogatory No. 12 to HPP Case 'No. C.A. No. 15-856-SLR dated Aug. 31, 2016, all enclosed pages cited.
Plaintiff's First Supplemental Responses to the Toro Company's Interrogatory Nos. 8 and 11 to HPP 'Case No. C.A. No. 15-856-SLR dated Aug. 31, 2016, all enclosed pages cited.
Plaintiffs Husqvarna AB and Husqvarna Professional Products, Inc.'s List of Claim Terms and Proposed Constructions Case No. C.A. No. 15-856-SLR, dated Jun. 17, 2016, all enclosed pages cited.
Plaintiffs' Initial Claim Charts for U.S. Pat. No. 9,055,713, Case No. 15-cv-856-SLR dated Apr. 13, 2016, all enclosed pages cited. (electronically submitted in 2 parts).
The Toro Company's Answering Claim Construction Brief regarding U.S. Pat. No. 9,055,713 B2, filed Sep. 2, 2016, all enclosed pages cited.
The Toro Company's First Supplemental Answers to Plaintiff's First Set of Interrogatories (Nos. 1, 2, 4, 7, 8) Case No. C.A. No. 15-856-SLR-SRF dated Aug. 26, 2016, all enclosed pages cited.
The Toro Company's Initial Invalidity Contentions, Case No. 15-cv-856-SLR dated May 13, 2016, all enclosed pages cited. (electronically submitted in 2 parts).
The Toro Company's Response to Plaintiff's Third Set of Interrogatories, Case No. 15-cv-856-'SLRSRF dated Jul. 18, 2016, all enclosed pages cited.
Toro 22in Recycler Lawn Mower Operator's Manual, Form No. 3360-862 Rev B, 2008, printed from http://www.toro.com/getpub/43137, all enclosed pages cited.

* cited by examiner

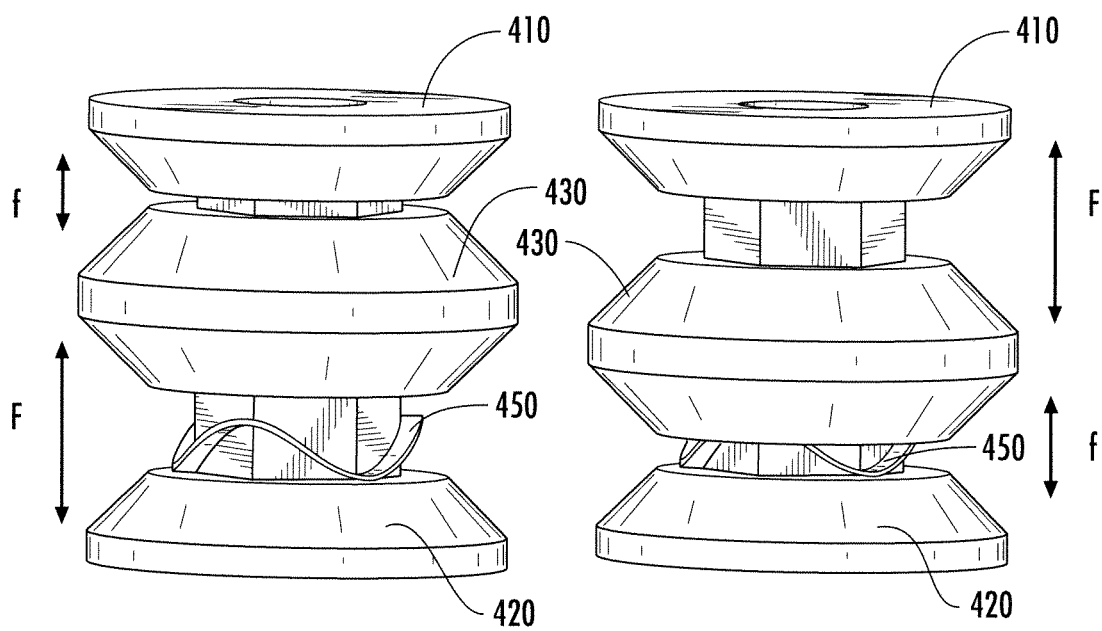

ALL WHEEL DRIVE, WALK BEHIND MOWER

CROSS-REFERENCE TO RELATED APPLICATIONS

This application is a continuation of U.S. application Ser. No. 15/468,355 filed Mar. 24, 2017, which is a continuation of U.S. application Ser. No. 14/377,736 filed on Aug. 8, 2014 (which issued on Apr. 18, 2017 as U.S. Pat. No. 9,622,407), which is a national phase entry of PCT/US2012/024853 filed Feb. 13, 2012, the entire contents of each of which are incorporated herein by reference.

TECHNICAL FIELD

Example embodiments generally relate to outdoor power equipment and, more particularly, relate to a walk behind lawn mower with selectable all wheel drive.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically relatively compact, have comparatively small engines and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers and/or the like) in addition to grass cutting components. Riding lawn mowers can also be ruggedly built and have sufficient power, traction, and handling capabilities to enable operators to mow over rough terrain, if needed.

Walk behind models are often used when smaller lots or tighter areas are to be mowed. Some, relatively simple walk behind models may move responsive only to the pushing force provided by the operator. However, other models may provide power to the wheels to assist the operator relative to providing mobility for the lawn mower. In many instances, the lawn mower may have power provided to either the front set of wheels, or the back set of wheels. The power may be provided, for example, via a belt system that is selectively powered off the same shaft that turns a blade for cutting grass.

More recently, some models have been provided with all wheel (or four wheel) drive. These models may provide improved traction to assist operators when mowing in rough terrain, on slopes, or in other inhospitable areas. All wheel drive models are most commonly operated in all wheel drive on a full time basis. However, even though some models have been designed to enable operators to shift between all wheel drive and two wheel drive configurations, these models typically require at least two actuators to be manipulated in order to initiate operation in all wheel drive mode or shift between two-wheel drive and all wheel drive modes of operation.

BRIEF SUMMARY OF SOME EXAMPLES

Some example embodiments may therefore provide alternative methods for employment of all wheel drive. In this regard, some embodiments may provide for a transfer between all wheel drive and another drive mode (e.g., two-wheel drive or no wheels being powered) using a single actuator or actuation mechanism. In some embodiments, actuation of all wheel drive may be accomplished in the context of the selective engagement of a single drive belt at one of a first transmission (which may be operably coupled to the rear or front wheels) or second transmission (which may be operably coupled to the other one of the rear or front wheel) via the single actuator. The selective engagement may be provided by rotation of either one of the transmissions (e.g., via rocking of the first or second transmission) or via rotation of an idler pulley. Either of these rotating/rocking components (e.g., the idler pulley or the transmission) may be engaged selectively via the single actuator or actuation mechanism. In some embodiments, a dual belt drive system may be employed instead of the single belt drive system. The rotation of either of the transmissions or an idler pulley may also be used to selectively engage one of the drive belts to switch between two-wheel and all wheel drive. However, as an alternative, a change speed gear may be employed to selectively engage all wheel drive.

In one example embodiment, a drive system is provided. The drive system may include a first transmission, a second transmission and at least one flexible driving member. The first transmission is operably coupled to a first set of wheels to provide drive power to the first set of wheels responsive to engagement of the first transmission. The second transmission is operably coupled to a second set of wheels to provide drive power to the second set of wheels responsive to engagement of the second transmission. The at least one flexible driving member is operably coupled to a remote actuator and a drive shaft of the walk-behind outdoor power equipment device. The at least one flexible member selectively engages one of the first transmission or the second transmission to switch the walk-behind outdoor power equipment device between two-wheel drive operation and all wheel drive operation via the remote actuator.

In another example embodiment, a lawn mower is provided. The lawn mower may include a blade housing, an engine supported at least in part by the blade housing to selectively rotate a drive shaft, a mobility assembly and a drive system. The mobility assembly may include a first set of wheels and second set of wheels selectively operably coupled to the engine to provide mobility of the lawn mower responsive at least in part to operation of the engine. The drive system may include a first transmission, a second transmission and at least one flexible driving member. The first transmission may be operably coupled to the first set of wheels to provide drive power to the first set of wheels responsive to engagement of the first transmission. The second transmission may be operably coupled to the second set of wheels to provide drive power to the second set of wheels responsive to engagement of the second transmission. The at least one flexible driving member may be operably coupled to a remote actuator and the drive shaft. The at least one flexible member may selectively engage one of the first transmission or the second transmission to switch the lawn mower between two-wheel drive operation and all wheel drive operation via the remote actuator.

Some example embodiments may provide an operator with a relatively easy way to switch between two-wheel and four wheel or all wheel drive with only the use of a single actuator or actuation mechanism.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 11 shows the change speed gear in two-wheel drive operation mode according to an example embodiment; and FIG. 12 show the change speed gear in four-wheel drive operation mode according to an example embodiment.

DETAILED DESCRIPTION

Figure 1:
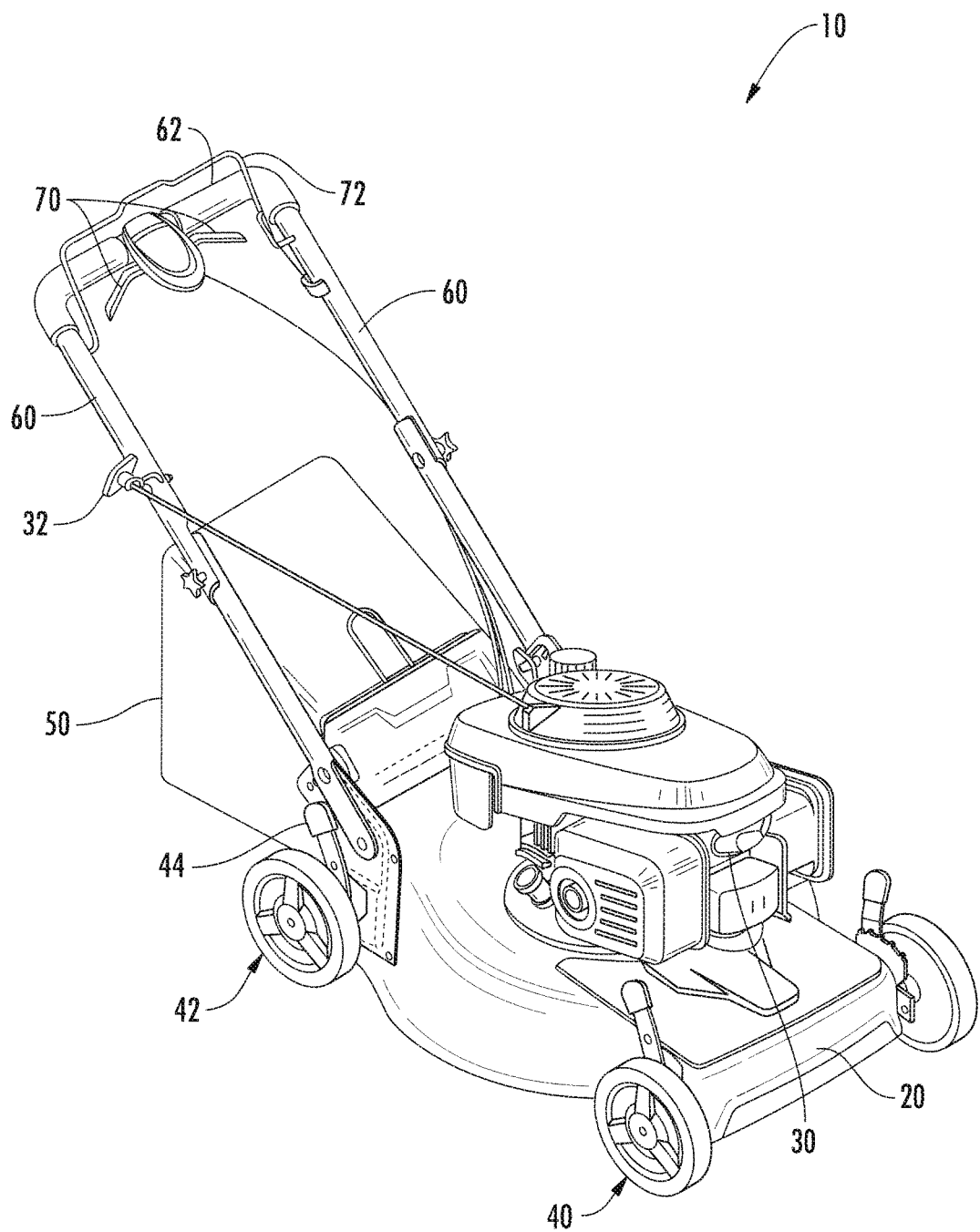
FIG. 1 illustrates a perspective view of a walk-behind lawn mower according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide alternative methods and/or structures for selective employment of all wheel drive on a walk-behind lawn mower. In this regard, some embodiments may provide for a transfer between all wheel drive and another drive mode (e.g., two wheel drive or no wheel drive) using a single actuator or actuation mechanism. Thus, for example, the lawn mower may be converted between two-wheel and all wheel drive operation, or converted between no wheel drive (e.g., where no drive power is coupled from the engine to either of the front or back wheels) and all wheel drive operation, by remote action of an operator without needing tools or complicated modifications. Some embodiments may employ a single drive belt, while other embodiments may employ two drive belts.

FIG. 1 illustrates a perspective view of a walk-behind lawn mower 10 of an example embodiment. The lawn mower 10 of FIG. 1 includes a blade housing 20 that may house a rotatable cutting blade (not shown). The cutting blade may be suspended above the ground at the end of a rotatable shaft (e.g., a drive shaft—again not shown in FIG. 1) that may be turned responsive to operation of an engine 30, such as a gasoline powered engine. Operation of the engine 30 may be initiated by a recoil starter via pulling of a recoil starter handle 32 by the operator. However, in other embodiments, the engine 30 may alternatively be started via a key, switch or other similar device.

The lawn mower 10 may include a mobility assembly on which a substantial portion of the weight of the lawn mower 10 may rest, when the lawn mower 10 is stationary. The mobility assembly may also provide for movement of the lawn mower 10. In some cases, the mobility assembly may be driven via power from the engine 30 that may be selectively provided to either or both of front wheels 40 and back wheels 42, which make up the mobility assembly. However, in some cases, the mobility assembly may simply provide for mobility of the lawn mower 10 responsive to pushing by the operator if, for example, drive power is not being provided to both the front wheels 40 and the back wheels 42. In other words, for example, the mobility assembly may be an active or passive provider of mobility for the lawn mower 10.

In some examples, the front wheels 40 and/or the back wheels 42 may be adjustable in their respective heights. Adjusting the height of the front wheels 40 and/or the back wheels 42 may be employed in order to provide a level cut and/or to adjust the height of the cutting blade. In some embodiments, a local wheel height adjuster 44 may be provided at the front wheels 40 and/or the back wheels 42. However, in other embodiments, remote wheel height adjustment may also or alternatively be possible.

Rotation of the cutting blade may generate grass clippings, and/or other debris that may be ejected from the blade housing 20. In some cases, the clippings/debris may be ejected from a side or rear of the blade housing 20. When rear discharge is employed, many such lawn mowers may employ a bagging attachment 50 to collect discharged clippings/debris. However, bagging attachments may also be used for side discharge models in some cases. The bagging attachment 50 may be removable to enable the operator to empty the bagging attachment 50.

In an example embodiment, the lawn mower 10 may further include a handle assembly. The handle assembly of FIG. 1 may include two handle members 60 that extend generally rearward and upward from opposing sides of a rear portion of the blade housing 20. The handle members 60 may be substantially parallel to each other and may be connected to each other at their distal ends via a cross bar 62. The handle members 60 may be adjustable in length or may be foldable to reduce the amount of space that the lawn mower 10 consumes when stored or shipped.

In some embodiments, various controls may be provided proximate to the cross bar 62 and/or one or more of the handle members 60. For example, the pictured embodiment shows a trigger controller 70 and a presence bar 72. When the presence bar 72 is held proximate to the cross bar 62, power may be enabled to be delivered to either or both of the front wheels 40 and the back wheels 42. The trigger controller 70 may be used to provide for remote actuation of various control functions. For example, pulling either or both of the movable members of the trigger controller 70 may cause adjustments to be made to one or more transmissions of the lawn mower 10 or may cause movement of components to actuate shifting from no drive operation (e.g., zero-wheel drive where movement is only responsive to operator pushing) to an all wheel drive configuration as described in greater detail below. As such, the trigger controller 70 provides one example of a remote actuator, or actuation mechanism, that may be employed to practice an example embodiment. In some cases, however, the trigger controller 70 may be replaced by a lever, knob, or other actuation device that may be operably coupled to a speed change gear, one or more transmissions or linkages associated therewith, and/or one or more idler pulleys or linkages associated therewith.

Figure 7:
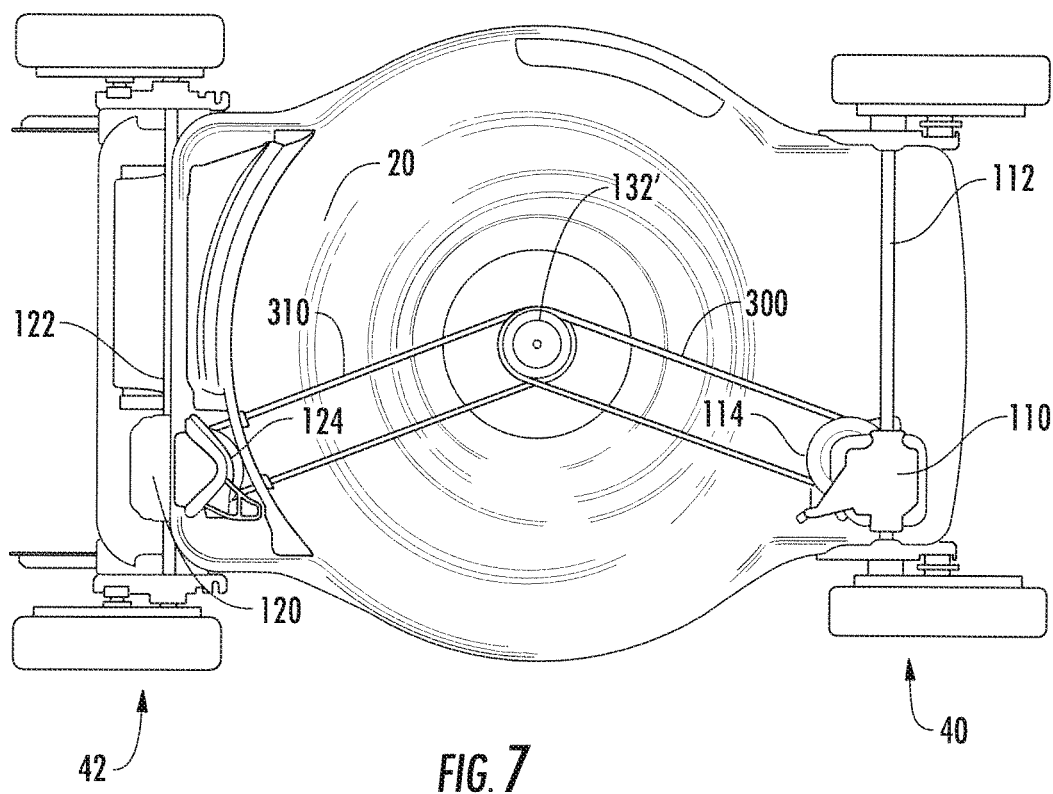
FIG. 7 illustrates a view of a two belt drive system from below the blade housing according to an example embodiment.
Figure 8:
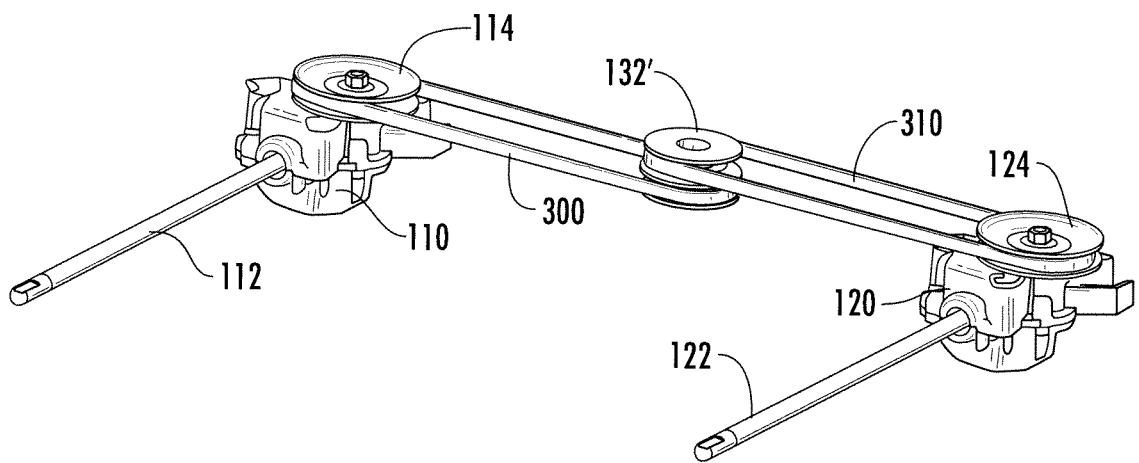
FIG. 8 illustrates a perspective view of components of the drive system in isolation according to an example embodiment.

In an example embodiment, the remote actuator (e.g., the trigger controller 70) may be configured to provide a single actuator enabled to shift the lawn mower 10 between all wheel drive operation and another drive mode (e.g., in either direction). Some example embodiments may accomplish the above-described functionality with a single drive belt, while other example embodiments may employ two drive belts. FIGS. 2-6 illustrate an example employing a single drive belt and FIGS. 7-8 illustrate an example employing two drive belts.

Figure 2:
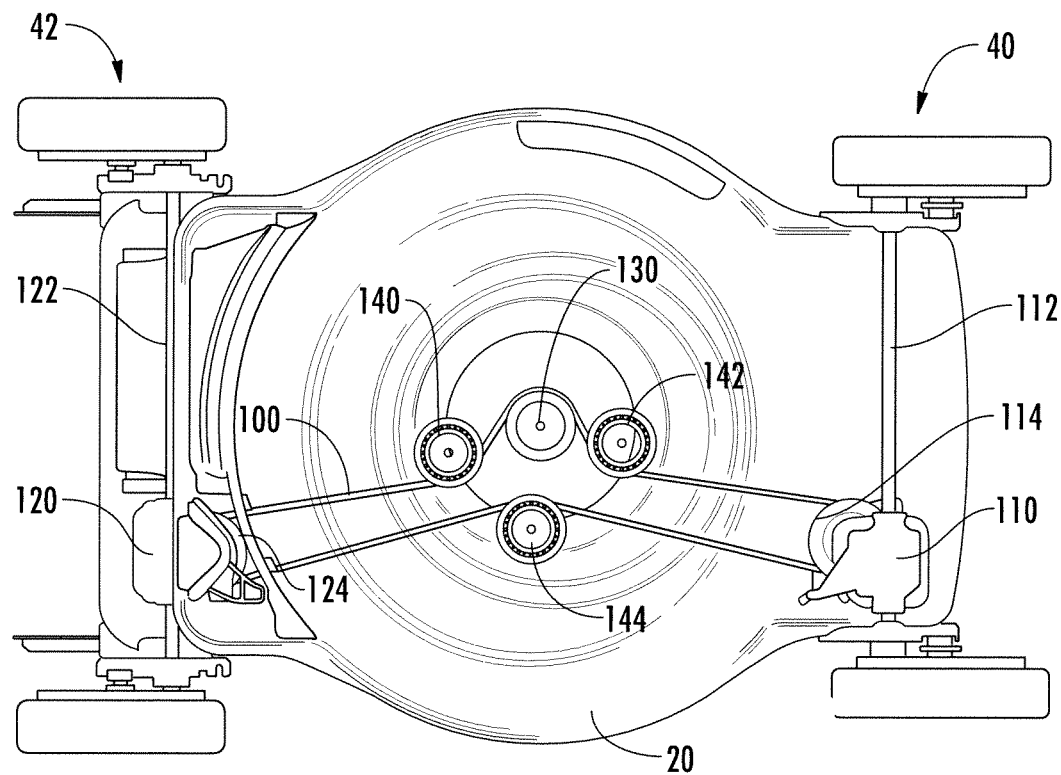
FIG. 2 illustrates a view of portions of a drive system of the lawn mower from below the blade housing of an example embodiment.

FIG. 2 illustrates a view from below the blade housing 20 of an example embodiment. In other words, FIG. 2 is a view from below ground level looking up into the under side of the blade housing 20. As shown in FIG. 2, a single drive belt 100 may be routed to a first transmission 110, which may operably coupled via axle 112 to selectively provide power to turn the front wheels 40 when the first transmission 110 is engaged, and a second transmission 120, which may be operably coupled via axle 122 to selectively provide power to turn the rear wheels 42 when the second transmission 120 is engaged. The first transmission 110 may include a first drive pulley 114 that is capable of engaging the drive belt 100 when there is sufficient tension (or lack of slack) between the drive belt 100 and the first drive pulley 114. The second transmission 120 may include a second drive pulley 124 that is capable of engaging the drive belt 100 when there is sufficient tension (or lack of slack) between the drive belt 100 and the second drive pulley 124. In an example embodiment, the amount of tension (or slack) between the drive pulleys and the drive belt 100 may be adjusted remotely for at least one of the drive pulleys as is shown and described in FIGS. 3-6.

The drive belt 100 may be operably (directly or indirectly) coupled to a drive shaft 130 that turns a blade (not shown) for cutting grass. For example, the drive shaft 130 may rotate responsive to operation of the engine 30 and turn a drive shaft pulley 132 that may be operably coupled to the drive shaft 130. The rotation of the drive shaft pulley 132 may cause corresponding movement of the drive belt 100 via engagement between the drive shaft pulley 132 and the drive belt 100 based on tension maintained between the drive shaft pulley 132 and the drive belt 100. The movement of the drive belt 100 may thereafter be selectively transferred to the first transmission 110 and/or the second transmission 120 via respective ones of the first drive pulley 114 and the second drive pulley 124.

In an example embodiment, one or more idler pulleys (e.g., primary idler pulleys 140 and 142 and secondary idler pulley 144) may be disposed proximate to the drive shaft pulley 132 in order to assist in providing tension between the drive belt 100 and the drive shaft pulley 132 and to provide for a desired alignment of the drive belt 100 as it engages the drive shaft pulley 132. Although three idler pulleys are shown in FIG. 2, it should be appreciated that either more or fewer idler pulleys may be employed in alternative embodiments. Furthermore, the location of the idler pulleys need not necessarily be the same as that which is shown in FIG. 2.

In the example of FIG. 2, the primary idler pulleys 140 and 142 are disposed substantially on opposite sides of the drive shaft pulley 132 and engage an opposite surface of the drive belt 100 than the surface engaged by the drive shaft pulley 132. In this regard, for example, the drive shaft pulley 132 engages an interior surface of the drive belt 100, while the primary idler pulleys 140 and 142 engage an exterior surface of the drive belt 100 to provide tension or tend to pull the drive belt 100 into contact with the drive shaft pulley 132. Meanwhile, the secondary idler pulley 144 is disposed to engage a portion of the drive belt 100 that extends between the first transmission 110 and the second transmission 120. The secondary idler pulley 144 also engages an exterior surface of the drive belt 100 in order to tend to pull the drive belt 100 into engagement with the other components of the drive system (e.g., the drive shaft pulley 132, the first drive pulley 114 and the second drive pulley 124). Given the configuration shown in FIG. 2, movement of the secondary idler pulley 144 closer toward the drive shaft pulley 132 would tend to tighten the drive belt 100. Meanwhile, movement of either or both of the primary idler pulleys 140 and 142 toward the secondary idler pulley 144 would also tend to tighten the drive belt 100. In some embodiments, a position of one or more of the idler pulleys may be adjustable in order to adjust the tightness of the drive belt 100.

When the drive belt 100 has sufficient tension with respect to its engagement with the first drive pulley 114 and the second drive pulley 124, both the first transmission 110 and the second transmission 120 may be engaged and all wheel drive operation may be provided. However, if the drive belt 100 does not have sufficient tension with respect to its engagement with one of either the first drive pulley 114 or the second drive pulley 124, the corresponding slack created thereby may translate into a situation in which sufficient tension may not be provided between the drive belt 100 and the drive shaft pulley 132 to turn the drive shaft pulley 132. Consequently, no drive operation may be achieved. In this regard, if the drive shaft pulley 132 is not turned, then both the first drive pulley 114 and the second drive pulley 124 lack sufficient tension, and drive power may not be communicated to the front wheels 40 and the rear wheels 42.

By providing a mechanism for altering belt tensioning of the drive belt 100 relative to the first transmission 110 and/or the second transmission 120, the operator of the lawn mower 10 may control transitions between all wheel drive operation and another drive mode (namely no drive operation). The alteration of belt tensioning may be accomplished via a number of different ways. Example embodiments of the present invention may enable the use of a single remote actuator to provide for belt tensioning control and thereby further provide for operator control of transitions between all wheel drive operation and another drive mode. At least in relation to the single drive belt embodiment shown in FIG. 2, belt tensioning may be controlled at least by enabling movement of an idler pulley to adjust tension of the drive belt 100 relative to at least one of the drive pulleys, or by enabling an adjustment of tension via movement of the drive pulley itself.

Figure 3:
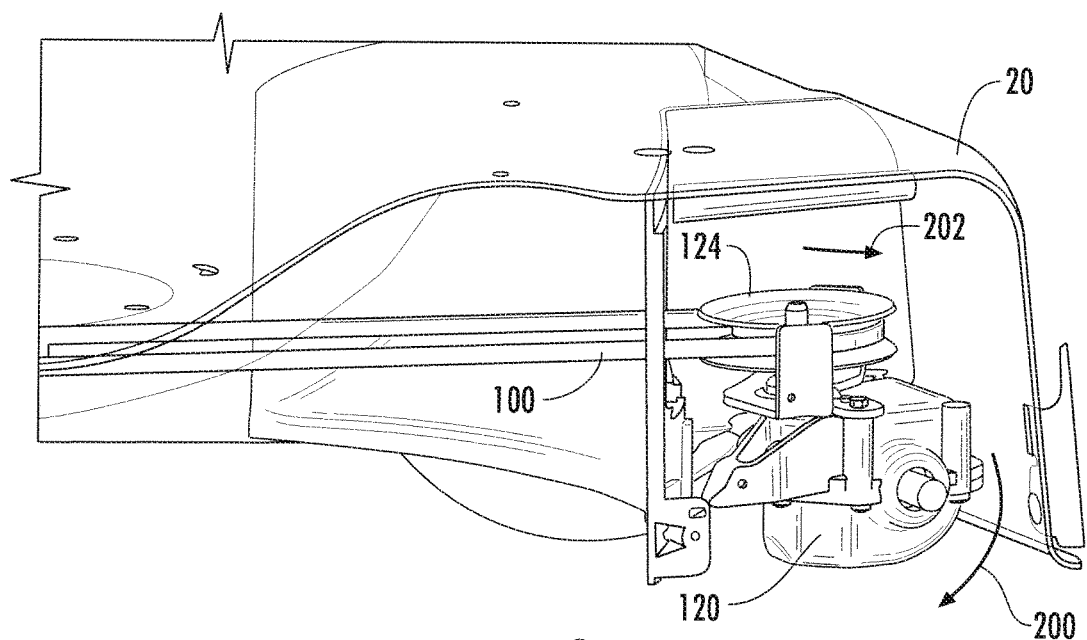
FIG. 3 illustrates a cutaway side view of a rear transmission of the drive system according to an example embodiment.
Figure 4:
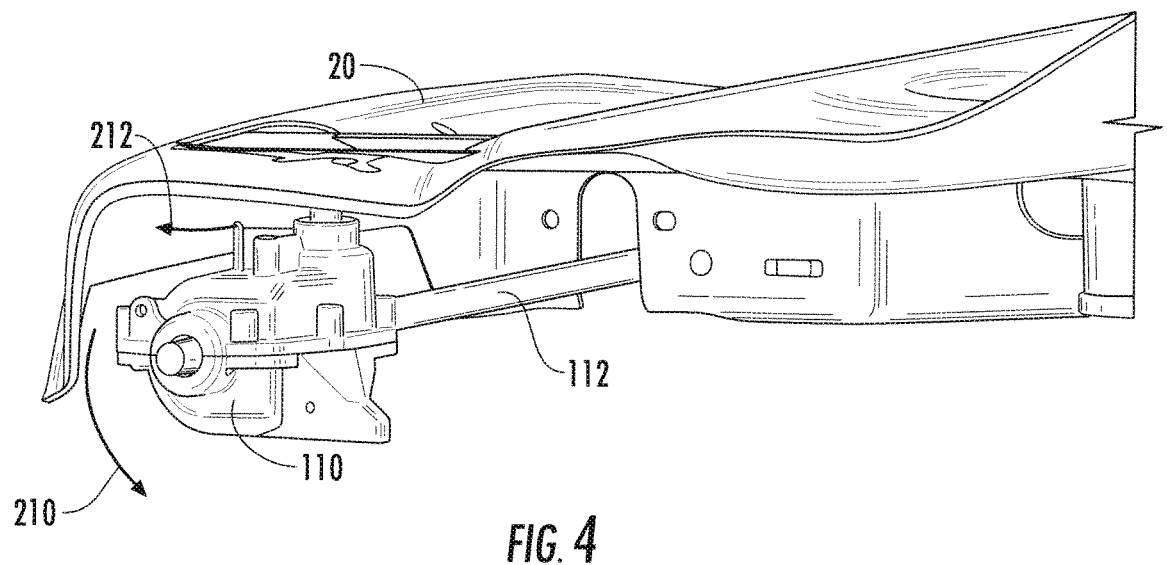
FIG. 4 illustrates a cutaway side view of a first transmission of the drive system according to an example embodiment.

FIGS. 3 and 4 illustrate example embodiments showing a belt tensioning scheme via which belt tension is adjusted by moving a position of the drive pulley itself. In this regard, FIGS. 3 and 4 show rocking transmissions that may be rocked (or rotated) at least to some degree to adjust belt tension of the drive belt 100 and thereby enable switching between all wheel drive operation and another drive mode.

FIG. 3 illustrates a cutaway side view of the second transmission 120 (e.g., a rear transmission) according to an example embodiment. As shown in FIG. 3, the drive belt 100 may engage the second drive pulley 124, which may be operably coupled to the second transmission 120. In this example, the second drive pulley 124 is mounted to a top portion of the second transmission 120, but other arrangements could alternatively be provided. The second transmission 120 may be enabled to be rocked or slightly rotated as shown by arrow 200 in order to adjust belt tension. For example, when the second transmission 120 is elevated (or not rocked/rotated), the tension between the drive belt 100 and the second drive pulley 124 may not be sufficient and slack may be provided in the drive belt 100. Accordingly, there may not be sufficient tension for the drive shaft pulley 132 to turn the drive belt 100 to force the second drive pulley 124. However, rotation or rocking of the second transmission 120 (as shown by arrow 200) may cause the second drive pulley 124 to be slightly farther away from the drive shaft pulley 132 (as shown by arrow 202) and increase the tension between the drive belt 100 and the second drive pulley 124 to a point where tension is increased between the drive shaft pulley 132 and the drive belt 100 causing corresponding movement of the second drive pulley 124 to provide drive power to the rear wheels 42 via the second transmission 120 and movement of the first drive pulley 114 to provide drive power to the front wheels 40 via the first transmission 110. In an alternative arrangement, the second transmission 120 may be rocked or rotated in order to decrease the tension, rather than increase the tension, between the drive belt 100 and the second drive pulley 124.

In some embodiments, instead of (or in addition to) providing the rear transmission as a rotating or rocking transmission as shown in FIG. 3, the front transmission (e.g., the first transmission 110) may be provided as a rotating or rocking transmission as shown in FIG. 4, which shows a cutaway side view of the first transmission 110 according to an example embodiment. As shown in FIG. 4, the first transmission 110 may be rotate or rock as shown by arrow 210. In this example, rotation or rocking of the first transmission 110 may cause the first transmission 110 to move slightly away from the drive shaft 130 as shown by arrow 212. This movement may increase the tension between the drive belt 100 and the first drive pulley 114 in a similar manner to that which is described above in connection with the description of FIG. 3.

In an example embodiment, a single actuator (e.g., the trigger controller 70 or some other remote actuation mechanism, lever, knob, etc.) may be operated in order to cause the first transmission 110 (or the second transmission 120) to rock or rotate as shown in FIG. 4 (or FIG. 3). In cases where only one of the transmissions is adjustable, zero-wheel drive or no drive power operation may be the default mode of operation. However, all wheel drive operation may be initiated responsive to rocking or rotation of the adjustable transmission via the single actuator. Accordingly, a single actuator may be used to transition between no drive power operation and all wheel drive operation.

Figure 5:
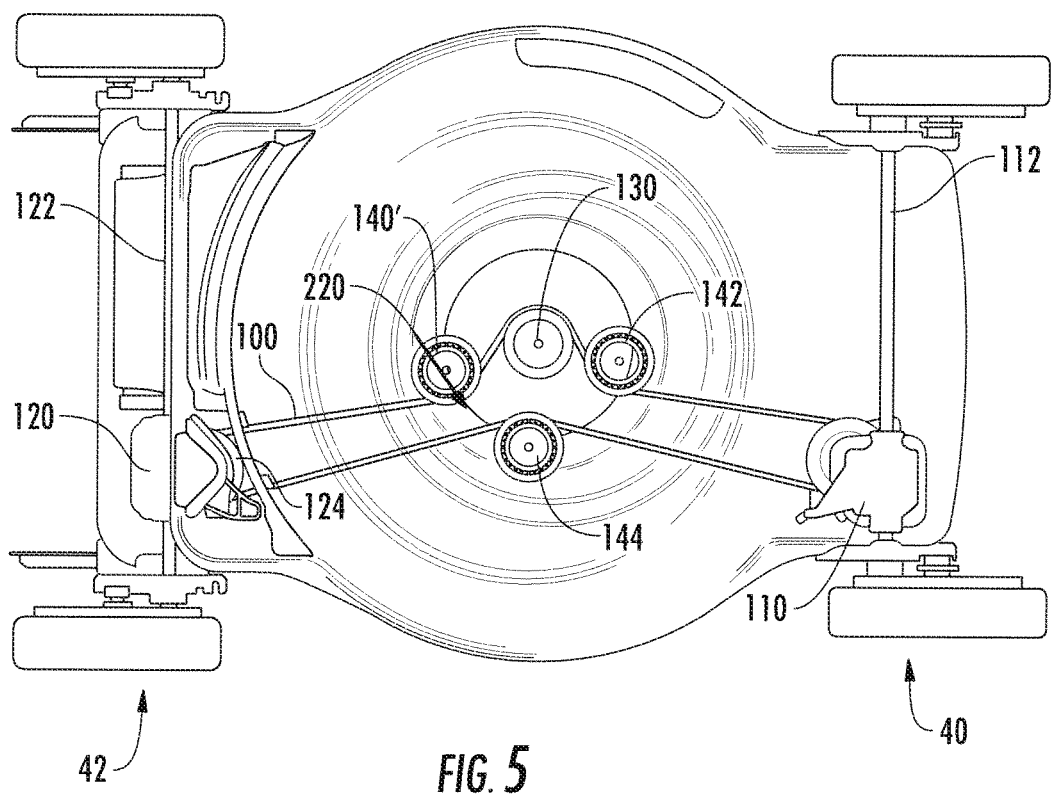
FIG. 5 illustrates an example in which one of the primary idler pulleys is adjustable according to an example embodiment.

As an alternative to causing belt tension adjustment via adjustment (e.g., rocking or rotation) of the transmission or transmissions, one or more movable idler pulleys may be provided to adjust belt tension. FIG. 5 illustrates an example in which one of the primary idler pulleys (e.g., idler pulley 140') is adjustable. Adjustable idler pulley 140' may be adjustable responsive to operation of the single actuator (e.g., the trigger controller 70 or some other remote actuation mechanism, lever, knob, etc.) in order to move the adjustable idler pulley 140' closer to the secondary idler pulley 144 (or simply in a direction that tends to tighten the drive belt 100) as shown by arrow 220. Movement of the adjustable idler pulley 140' may cause tension between the drive belt 100 and the second drive pulley 124 to be increased to a level sufficient to cause the second drive pulley 124 to rotate responsive to movement of the drive belt 100 due to a lack of slack between the drive belt 100 and the drive shaft pulley 132. Prior to movement of the adjustable idler pulley 140' in the direction shown by arrow 220, the belt tension provided between the drive belt and the second drive pulley 124 may not be sufficient to cause slack to be taken up in the drive belt 100 and thus the drive belt 100 is not turned by the drive shaft pulley 132. Thus, in this embodiment also, a single actuator may be employed to remotely enable a shift between all wheel drive operation and no drive power operation. It should be appreciated that alternatively (or additionally), primary pulley 142 may be adjustable in a similar fashion to allow tensioning of the drive belt 100 relative to the first drive pulley 114.

Figure 6:
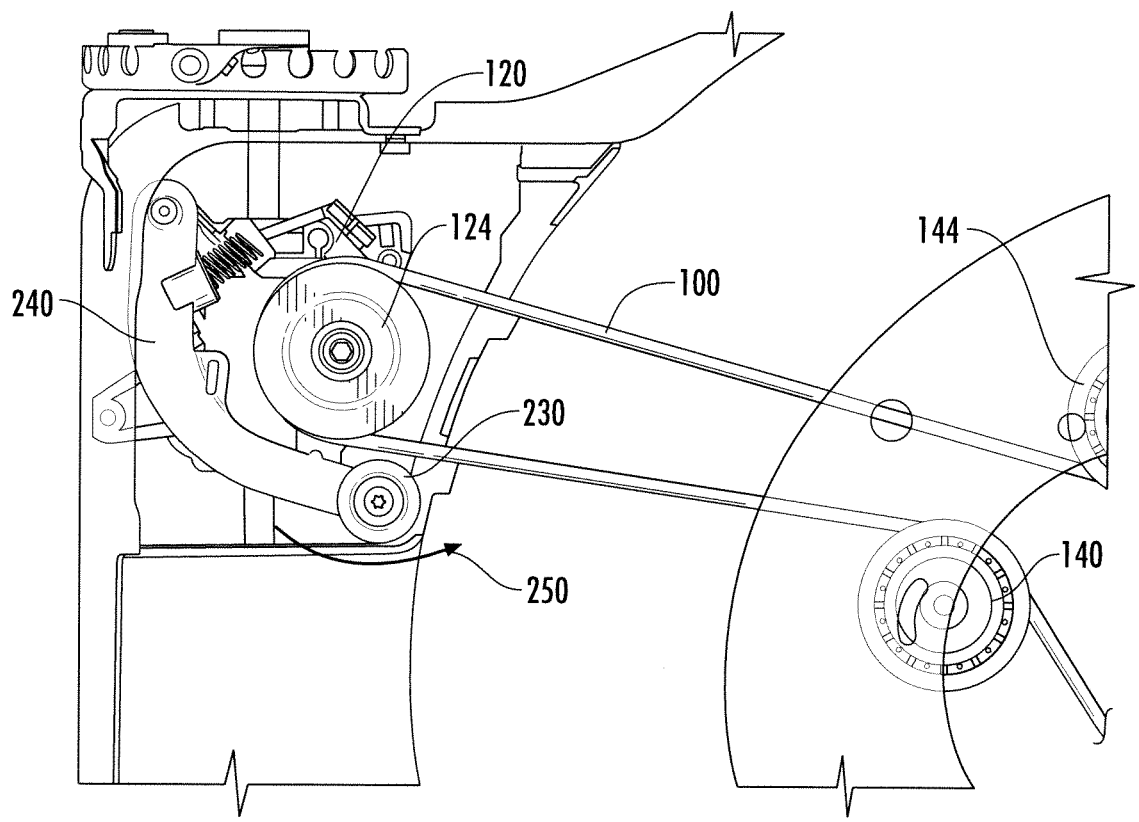
FIG. 6 illustrates a partially cutaway top view of the area surrounding the second transmission to show another alternative embodiment in which belt tensioning relative to one of the drive pulleys may be provided by movement of an idler pulley according to an example embodiment.

FIG. 6 illustrates a partially cutaway top view of the area surrounding the second transmission 120 to show another alternative embodiment in which belt tensioning relative to one of the drive pulleys may be provided by movement of an idler pulley. However, in the example of FIG. 6, a movable idler pulley 230 is provided proximate to the second drive pulley 124 and the primary idler pulley 140 may be stationary. In this example, the movable idler pulley 230 may be disposed proximate to the drive belt 100 at a portion of a rotatable arm 240. The rotatable arm 240 may be rotated as shown by arrow 250 responsive to operation of the single actuator (e.g., the trigger controller 70 or some other remote actuation mechanism, lever, knob, etc.). When the rotatable arm 240 rotates as shown by arrow 250, the movable idler pulley 230 may contact an exterior surface of the drive belt 100 to reduce the slack of the drive belt 100 and increase the tension between the drive belt 100 and the second drive pulley 124. The tension may be increased to a level sufficient to cause movement of the drive belt 100 to turn the second drive pulley 124 via the rotation of the drive shaft pulley 132.

Although FIG. 6 shows the movable idler pulley 230 being employed in connection with the second transmission 120, it should be appreciated that a movable idler pulley may also or alternatively be employed in connection with the first transmission 110. Thus, either or both of the first transmission 110 and the second transmission 120 may be selectively engaged to be driven via movement of the drive belt 110 via a movable idler pulley disposed proximate to the first transmission 110 or the second transmission 120, respectively, to adjust tension between the drive belt 110 and the first drive pulley 114 or the second drive pulley 124 using a single actuator.

As indicated above, selective switching between all wheel drive operation and no drive power operation via operation of a single actuator may be accomplished with a single drive belt. However, some alternatives may be provided in connection with a dual drive belt embodiment. FIGS. 7 and 8 illustrate an example embodiment in which a two belt drive system are employed. In this regard, FIG. 7 illustrates a view of the two belt drive system from below the blade housing 20 and FIG. 8 illustrates a perspective view of components of the drive system in isolation. Similar to the embodiments described above, the lawn mower 10 may include the first transmission 110 drivable by the first drive pulley 114 and capable of turning the first axle 112 along with the second transmission 120 drivable by the second drive pulley 124 and capable of turning the second axle 122. However, the first and second drive pulleys 114 and 124 may each engage different drive belts. Moreover, the drive shaft pulley 132' may be configured to accommodate, and have the potential to turn, two separate drive belts including a first drive belt 300 and a second drive belt 310. In an example embodiment, the drive shaft pulley 132' may be configured to have a stacked arrangement of pulleys operably coupled to the drive shaft 130 to turn respective ones of the first and second drive belts 300 and 310.

In an example embodiment, one of the first drive belt 300 or the second drive belt 310 may be configured to be tensioned sufficiently to turn its respective first or second drive pulley 114 or 124 by default. Tension may be selectively increased or decreased for the other one of the first drive belt 300 or second drive belt 310 to switch between two-wheel drive operation and all wheel drive operation via the single actuator. The particular one of the first drive pulley 114 or the second drive pulley 124 that is configured to be tensioned to turn responsive to movement of its corresponding drive belt by default may be alternated in corresponding alternative embodiments. Moreover, any of the tensioning mechanisms described above in connection with the descriptions of FIGS. 3-6 may be employed. Thus, for example, either the first transmission 110 or the second transmission 120 may be enabled to be rocked or rotated (e.g., responsive to actuation of the single actuator) to adjust belt tension similar to the examples shown in FIGS. 3 and 4. Alternatively, one or more idler pulleys may be used to adjust tension of one of the drive belts and the idler pulleys may be disposed proximate to the drive shaft pulley 132' or proximate to the first drive pulley 114 or second drive pulley 124 similar to the examples shown in FIGS. 5 and 6.

However, one possible alternative to providing rocking or rotation of one or more of the transmissions, or providing movement of one or more idler pulleys to cause tensioning adjustments for one of the drive belts, may be to configure the drive shaft pulley 132' as a dual pulley that is enabled to selectively engage at least one of the belts engaged with the dual pulleys. The selectively engageable dual pulley of one example embodiment may be referred to as a change-speed gear. FIGS. 9-12 illustrate various examples of a change-speed gear to facilitate description of some example embodiments.

Figure 9:
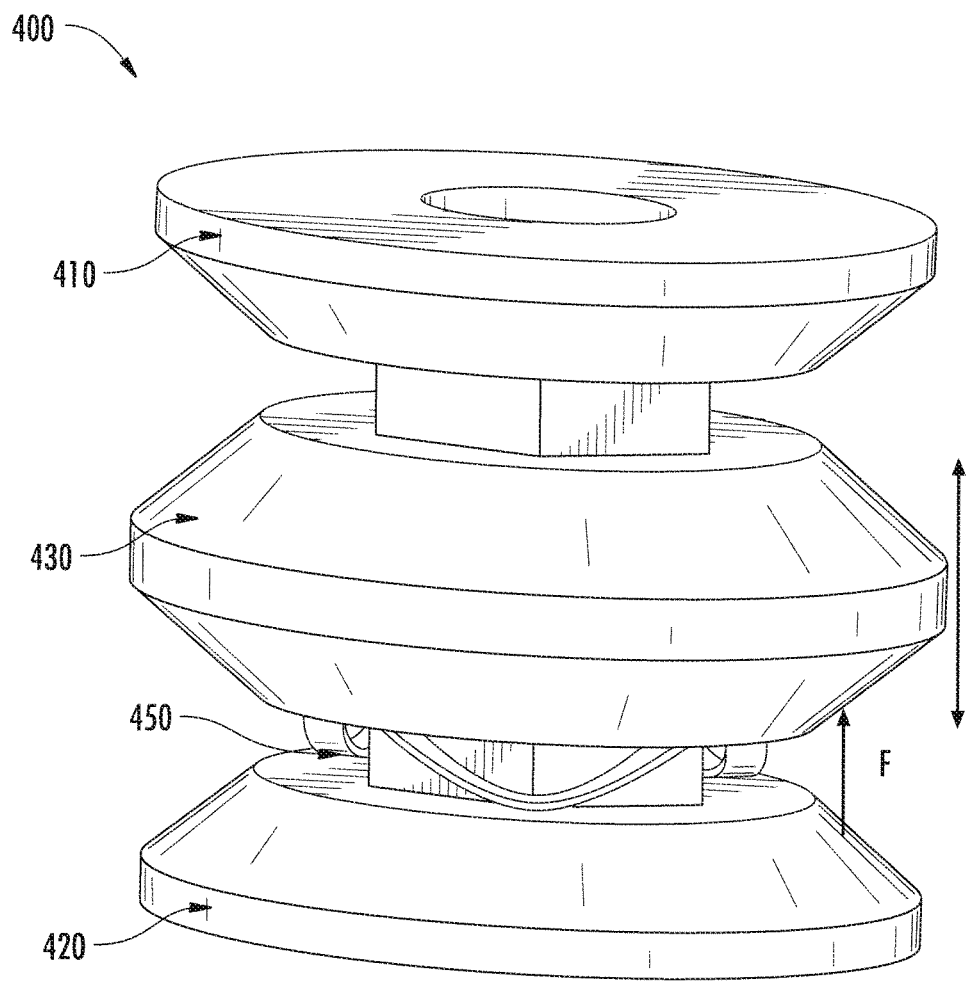
FIG. 9 shows a side view of a change-speed gear of an example embodiment.
Figure 10:
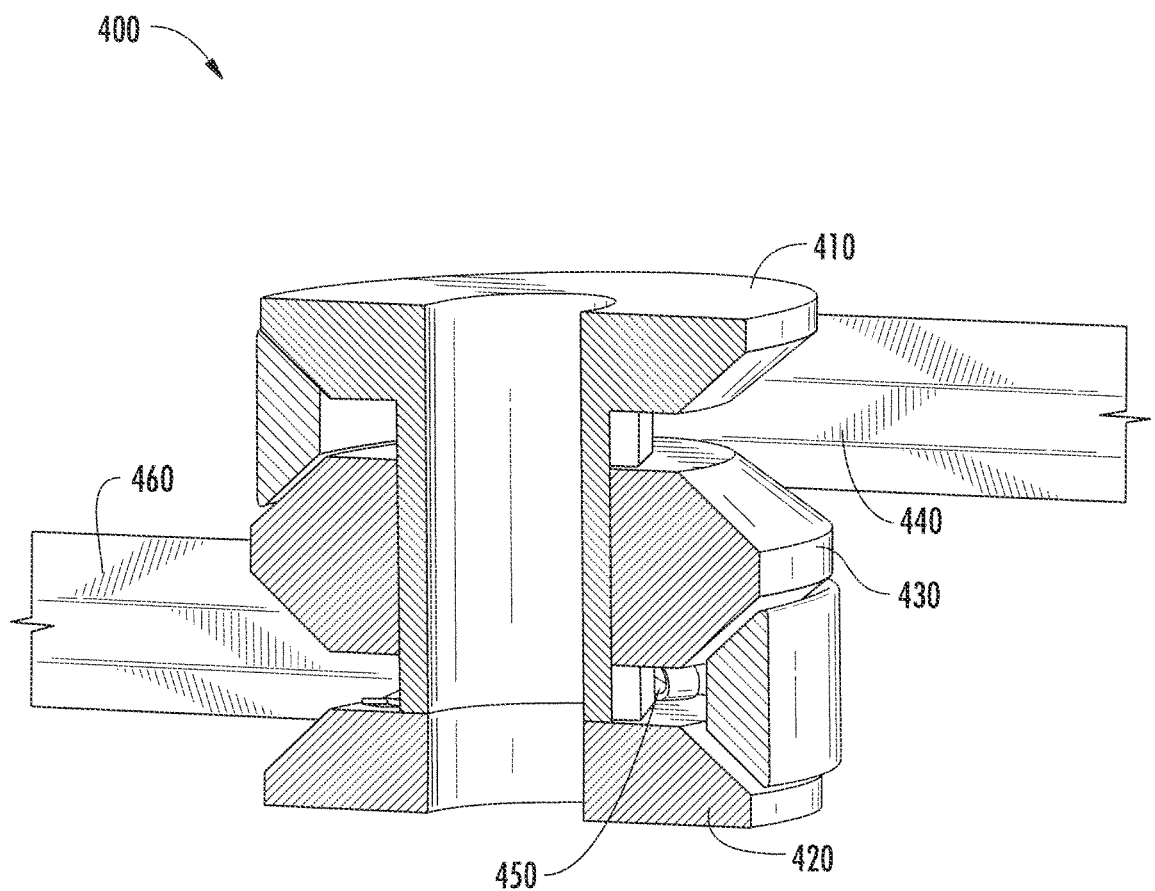
FIG. 10 illustrates a cross sectional view along a rotational axis of the change-speed gear of FIG. 9 according to an example embodiment.

FIG. 9 shows a side view of a change-speed gear 400 of an example embodiment and FIG. 10 illustrates a cross sectional view along a rotational axis of the change-speed gear 400 of FIG. 9. As shown in FIGS. 9 and 10, the change-speed gear 400 may include a first fixed disc 410 and a second fixed disc 420, each of which may be disposed at opposite ends of the change-speed gear 400 facing one another. The change-speed gear 400 may also include a sliding disc 430 disposed between the first and second fixed discs 410 and 420. The sliding disc 430 may be biased toward the first fixed disc 410 in order to supply sufficient force to engage a first drive belt 440 that is disposed between the first fixed disc 410 and the sliding disc 430. In an example embodiment, a spring 450 (e.g., a wave spring or any other suitable type of spring) may be used to provide the biasing force. Accordingly, until the biasing force of the spring 450 is overcome, the sliding disc 430 may not be positioned to provide friction with sufficient force to engage a second drive belt 460 that is disposed between the second fixed disc 420 and the sliding disc 430.

In an example embodiment, the first drive belt 440 may be engaged regardless of the position of the sliding disc 430 when the device is in drive mode. Thus, at least two-wheel drive operation may always be provided via the first drive belt 440 when in drive mode. However, in some embodiments, the tension between the first drive belt 440 and the sliding disc 430 may also be adjustable via the single actuator in order to permit transitioning to no drive operation. When in two-wheel drive operation, the second drive belt 460 may also be engaged to cause a shift from two-wheel drive operation to all wheel drive operation by overcoming the spring 450. In an example embodiment, a remote actuator may be used to overcome the spring force of the spring 450. The remote actuator may be operated from the handle assembly of the device (e.g., the trigger controller 70) or a knob, lever or other actuator disposed proximate to a housing of the device. In some embodiments, drive paddles or another method of exerting a force may be employed to overcome the biasing force of the spring 450. For example, drive paddles may be pushed in to about ⅔ of their full stroke for two-wheel drive operation and, responsive to operation of the remote actuator, the paddles may be enabled to use the final ⅓ of the full stroke and thereby overcome the spring 450 to engage four-wheel drive operation.

FIGS. 11 and 12 show the change speed gear 400 in two-wheel drive and four-wheel drive operation, respectively. As shown in FIG. 11, the sliding disc 430 is pushed upward by the spring 450 to keep any drive belt disposed between the sliding disc 430 and the second fixed disc 420 from rotating. However, as shown in FIG. 12, when the spring 450 force is overcome, the sliding disc 430 moves downward and the drive belt disposed between the sliding disc 430 and the second fixed disc 420 would be engaged for rotation.

Thus, according to various example embodiments, actuation of all wheel drive may be accomplished in the context of the selective engagement of a single drive belt at one of a first transmission (which may be operably coupled to the rear or front wheels) or second transmission (which may be operably coupled to the other one of the rear or front wheel) via the single actuator. The selective engagement may be provided by rotation of either one of the transmissions (e.g., via rocking of the first or second transmission) or via rotation of an idler pulley. Either of these rotating/rocking components (e.g., the idler pulley or the transmission) may be engaged selectively via the single actuator or actuation mechanism. However, in some embodiments, a dual belt drive system may be employed instead of the single belt drive system. The rotation of either of the transmissions or an idler pulley may also be used to selectively engage one of the drive belts to switch between two-wheel and all wheel drive. However, as an alternative, a change speed gear may be employed to selectively engage all wheel drive.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A lawn mower comprising:
   a blade housing;
   an engine supported at least in part by the blade housing and configured to rotate a drive shaft;
   a mobility assembly operably coupled to the engine and configured to provide mobility of the lawn mower responsive at least in part to operation of the engine, wherein the mobility assembly comprises a first set of wheels and a second set of wheels;
   a drive system comprising:
      a first transmission operably coupled to the first set of wheels;
      a second transmission operably coupled to the second set of wheels;
      a single flexible driving member; and
      an idler pulley; and
   a remote actuator operably coupled to the drive system,
   wherein the idler pulley moves from a first position to a second position responsive to operation of the remote actuator,
   wherein the single flexible driving member enables switching the lawn mower from a no wheel drive operation to an all wheel drive operation based on movement of the idler pulley from the first position to the second position.

2. The lawn mower of claim 1, wherein the drive system further comprises a second idler pulley,
   wherein, while in the all wheel drive operation, the second idler pulley engages the flexible driving member, and
   wherein the idler pulley is closer to the second idler pulley in the second position than in the first position.

3. The lawn mower of claim 1, wherein the drive system further comprises a second idler pulley,
   wherein, while in the all wheel drive operation, the second idler pulley engages the flexible driving member, and
   wherein, responsive to operation of the remote actuator, the idler pulley moves towards the second idler pulley.

4. The lawn mower of claim 3, wherein the drive system further comprises a third idler pulley,
   wherein the drive shaft comprises a drive shaft pulley,
   wherein the idler pulley and the third idler pulley are disposed substantially on opposite sides of the drive shaft pulley relative to each other, and
   wherein, while in the all wheel drive operation, the idler pulley and the third idler pulley engage a surface of the flexible driving member.

5. The lawn mower of claim 1, wherein the first transmission comprises a first drive pulley,
   wherein the drive shaft comprises a drive shaft pulley,
   wherein, while in the all wheel drive operation, the first drive pulley engages the flexible driving member, and
   wherein, while in the all wheel drive operation, the idler pulley is positioned substantially between the drive shaft pulley and the first drive pulley, and is positioned closer to the drive shaft pulley than to the first drive pulley.

6. The lawn mower of claim 1, wherein the first transmission comprises a first drive pulley,
   wherein the drive shaft comprises a drive shaft pulley,
   wherein, while in the all wheel drive operation, the first drive pulley engages the flexible driving member,
   wherein the idler pulley is disposed closer to the first drive pulley than to the drive shaft pulley, and
   wherein, responsive to operation of the remote actuator, the idler pulley moves relative to the first drive pulley.

7. The lawn mower of claim 6, wherein the idler pulley is disposed at a portion of a rotatable arm, and
   wherein, responsive to operation of the remote actuator, the rotatable arm rotates to cause the idler pulley to move to engage the flexible driving member with the first drive pulley.

8. The lawn mower of claim 7, wherein the first transmission is a rear transmission positioned substantially between the drive shaft and a handle assembly of the lawn mower.

9. The lawn mower of claim 1, wherein the flexible driving member is a drive belt.

10. The lawn mower of claim 1, wherein the remote actuator comprises a lever.

11. The lawn mower of claim 1, wherein, responsive to operation of the remote actuator, the first transmission is configured to drive the first set of wheels through a range of increasing speeds while the lawn mower is switched from no wheel drive operation to the all wheel drive operation.

12. The lawn mower of claim 1, wherein the idler pulley is disposed proximate a drive pulley disposed at the first transmission.

13. The lawn mower of claim 1, wherein the idler pulley is disposed proximate to the drive shaft.

14. A drive system comprising:
   a first transmission operably coupled to a first set of wheels of a walk-behind outdoor power equipment device;
   a second transmission operably coupled to a second set of wheels of the walk-behind outdoor power equipment device;
   a single flexible driving member; and
   an idler pulley,
   wherein the idler pulley moves from a first position to a second position responsive to operation of a remote actuator of the walk-behind outdoor power equipment device,
   wherein the single flexible driving member enables switching the lawn mower from a no wheel drive operation to an all wheel drive operation based on movement of the idler pulley from the first position to the second position.

15. The drive system of claim 14, wherein the drive system further comprises a second idler pulley,
   wherein, while in the all wheel drive operation, the second idler pulley engages the flexible driving member, and
   wherein the idler pulley is closer to the second idler pulley in the second position than in the first position.

16. The drive system of claim 14, wherein the drive system further comprises a second idler pulley,
  wherein, while in the all wheel drive operation, the second idler pulley engages the flexible driving member, and
  wherein, responsive to operation of the remote actuator, the idler pulley moves towards the second idler pulley.

17. The drive system of claim 16, wherein the drive system further comprises a third idler pulley,
  wherein the drive shaft comprises a drive shaft pulley,
  wherein the idler pulley and the third idler pulley are disposed substantially on opposite sides of the drive shaft pulley relative to each other, and
  wherein, while in the all wheel drive operation, the idler pulley and the third idler pulley engage a surface of the flexible driving member.

18. The drive system of claim 14, wherein the first transmission comprises a first drive pulley,
  wherein the drive shaft comprises a drive shaft pulley,
  wherein, while in the all wheel drive operation, the first drive pulley engages the flexible driving member, and
  wherein, while in the all wheel drive operation, the idler pulley is positioned substantially between the drive shaft pulley and the first drive pulley, and is positioned closer to the drive shaft pulley than to the first drive pulley.

19. The drive system of claim 14, wherein the first transmission comprises a first drive pulley,
  wherein the drive shaft comprises a drive shaft pulley,
  wherein, while in the all wheel drive operation, the first drive pulley engages the flexible driving member,
  wherein the idler pulley is disposed closer to the first drive pulley than to the drive shaft pulley, and
  wherein, responsive to operation of the remote actuator, the idler pulley moves relative to the first drive pulley.

20. The drive system of claim 19, wherein the idler pulley is disposed at a portion of a rotatable arm, and
  wherein, responsive to operation of the remote actuator, the rotatable arm rotates to cause the idler pulley to move to engage the flexible driving member with the first drive pulley.

* * * * *